US012689541B2

(12) United States Patent
Fries et al.

(10) Patent No.: US 12,689,541 B2
(45) Date of Patent: Jul. 21, 2026

(54) SYSTEM INCLUDING A COMMUNICATION BUS FOR DATA TRANSMISSION AND METHOD FOR OPERATING A COMMUNICATION BUS

(71) Applicant: Siemens Aktiengesellschaft, Munich (DE)

(72) Inventors: Edgar Fries, Neunkirchen am Brand (DE); Jan Vollmar, Nuremberg (DE); Christof Tinnes, Grosbliederstroff (FR); Johannes Weiss, Lisberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 158 days.

(21) Appl. No.: 18/210,272

(22) Filed: Jun. 15, 2023

(65) Prior Publication Data

US 2023/0412421 A1 Dec. 21, 2023

(30) Foreign Application Priority Data

Jun. 21, 2022 (EP) ..................................... 22180096

(51) Int. Cl.
*H04L 12/40* (2006.01)

(52) U.S. Cl.
CPC .............................. *H04L 12/40169* (2013.01)

(58) Field of Classification Search
CPC ....... H04L 12/40169; H04L 2012/4026; H04L 2012/40032; G06F 40/58
See application file for complete search history.

(56) References Cited

U.S. PATENT DOCUMENTS

| | | | | |
|---|---|---|---|---|
| 6,075,789 A * | 6/2000 | Kasslin | .................. | H04H 20/02 |
| | | | | 370/413 |
| 6,345,047 B1 * | 2/2002 | Regnier | .............. | H04L 12/6418 |
| | | | | 370/352 |
| 7,756,815 B2 * | 7/2010 | Lei | ......................... | G06Q 30/02 |
| | | | | 707/999.102 |

(Continued)

FOREIGN PATENT DOCUMENTS

| | | |
|---|---|---|
| CN | 103458033 A | 12/2013 |
| CN | 108540361 A | 9/2018 |

OTHER PUBLICATIONS

Zheng, Liangzhao, et al. "A Semantic Publish/Subscribe System" IBM T.J. Watson Research Center. IEEE Computer Society. IEEE International Conference on E-Commerce Technology for Dynamic E-Business (CEC-East'04) (Year: 2004).*

*Primary Examiner* — Stephen J Clawson
(74) *Attorney, Agent, or Firm* — Schmeiser Olsen PLLC

(57) ABSTRACT

A system including a communication bus for data transmission includes: a first interface unit configured to receive a first event message from a first entity coupled to the first interface unit; a second interface unit for coupling a second entity; a backlog storage unit configured to store the first event message and to determine whether the second entity is a subscriber of the first event message; and a first bridge unit configured to translate, if the second entity is a subscriber of the first event message, the first event message by using a first semantic translation into a translated first event message, wherein the second interface unit is configured to receive the translated first event message and to transmit the translated first event message to the second entity.

15 Claims, 2 Drawing Sheets

(56)                References Cited

U.S. PATENT DOCUMENTS

| | | | | |
|---|---|---|---|---|
| 7,877,421 | B2 * | 1/2011 | Berger | G06F 16/288 |
| | | | | 707/975 |
| 7,930,293 | B2 * | 4/2011 | Fox | G06F 16/25 |
| | | | | 707/713 |
| 8,060,531 | B2 * | 11/2011 | Edelstein | G06F 16/84 |
| | | | | 707/791 |
| 8,112,416 | B2 * | 2/2012 | Liu | G06F 40/30 |
| | | | | 707/720 |
| 10,397,303 | B1 * | 8/2019 | Kuo | H04L 61/45 |
| 2002/0087710 | A1 * | 7/2002 | Aiken | H04L 49/901 |
| | | | | 709/232 |
| 2004/0214586 | A1 * | 10/2004 | Loganathan | H04W 92/02 |
| | | | | 455/456.2 |
| 2005/0021860 | A1 * | 1/2005 | Kelly | H04L 12/4625 |
| | | | | 709/230 |
| 2005/0076150 | A1 * | 4/2005 | Lee | H04L 12/282 |
| | | | | 700/1 |
| 2008/0126491 | A1 * | 5/2008 | Portele | H04L 51/063 |
| | | | | 709/206 |
| 2010/0103944 | A1 * | 4/2010 | Chang | H04L 12/4616 |
| | | | | 370/401 |
| 2010/0260102 | A1 * | 10/2010 | Liu | H04L 1/1657 |
| | | | | 370/328 |
| 2012/0096065 | A1 * | 4/2012 | Suit | H04L 41/0816 |
| | | | | 709/202 |
| 2014/0128994 | A1 * | 5/2014 | Hallman | H04L 12/2809 |
| | | | | 700/12 |
| 2015/0229741 | A1 * | 8/2015 | Kim | H04L 12/40169 |
| | | | | 370/467 |
| 2016/0019294 | A1 * | 1/2016 | Dong | G16H 40/67 |
| | | | | 707/794 |
| 2017/0324844 | A1 * | 11/2017 | Schroeder | H04L 12/40 |
| 2018/0081962 | A1 * | 3/2018 | Obitko | G06F 16/31 |
| 2018/0191650 | A1 * | 7/2018 | Kohli | G06F 9/542 |
| 2018/0232959 | A1 | 8/2018 | Thornburg et al. | |
| 2020/0348662 | A1 * | 11/2020 | Cella | G06N 3/084 |
| 2020/0391759 | A1 * | 12/2020 | Hwang | H04L 69/08 |
| 2021/0092018 | A1 | 3/2021 | Fang et al. | |
| 2021/0176092 | A1 * | 6/2021 | Frischmuth | H04L 12/40032 |
| 2022/0086021 | A1 * | 3/2022 | Philippe | H04L 67/12 |
| 2024/0004929 | A1 * | 1/2024 | Miranker | G06F 16/86 |
| 2024/0098579 | A1 * | 3/2024 | Yau | H04L 65/1016 |
| 2024/0137243 | A1 * | 4/2024 | Schaefer | H04L 12/40169 |

* cited by examiner

| | |
|---|---|
| Receive a First Event Message EM1 from the First Entity | S100 |
| Determine Whether the Second Entity is a Subscriber | S101 |
| Translate the Received First Event Message EM1 | S102 |
| Receive Translated First Event Message tEM1 | S103 |
| Transmit Received Translated First Event Message tEM1 | S104 |

SYSTEM INCLUDING A COMMUNICATION BUS FOR DATA TRANSMISSION AND METHOD FOR OPERATING A COMMUNICATION BUS

CROSS-REFERENCE TO RELATED APPLICATIONS

This application claims priority to EP Application No. 22180096.4, having a filing date of Jun. 21, 2022, the entire contents of which are hereby incorporated by reference.

FIELD OF TECHNOLOGY

The following relates to a system including a communication bus for data transmission as well as to a method and to a computer program product for operating a communication bus.

BACKGROUND

Conventionally, in engineering projects such as a design of a production facility, many different disciplines are involved each using different engineering tools. These different disciplines communicate with each other via different communication channels and/or different communication busses.

For example, an automated conveyer which transports goods between locations A and B is to be implemented in the production facility. Part of this engineering process is the physical design (construction of the conveyer band) by a mechanical discipline, the electrical design (power demand and electrical cabling) by an electrical discipline and the automation design (to control the speed of the band and coordinate handovers with involved devices) by an automation discipline.

In some cases, after the automated conveyer is designed and created the distance between locations A and B has increased. Thus, the length of the conveyer band needs to be increased. This is an occurred change in the physical design, which leads to a changed electrical design (i.e., longer cables required), changed automation design (goods transported on the conveyer band require more time to move) and finally different components (i.e., a more powerful motor is required).

These occurred changes generally lead to complex and difficult to manage interdependencies between the different disciplines.

One challenge here is to communicate the occurred changes between the individual different disciplines because, as mentioned before, the disciplines each communicate via different communication channels and/or different communication busses. This often leads to the fact that the occurred changes are not propagated to engineering tools which need to be aware of these changes, leading to failures and inconsistencies in the engineering project. This in turn results in a low reliability of the data transmission, in particular the transmission of occurred changes, between individual disciplines.

SUMMARY

An aspect relates to improve the reliability of a communication bus.

According to a first aspect, a system including a communication bus for data transmission between multiple entities coupled to the communication bus is proposed. The system comprising:

a first interface unit configured to receive a first event message from a first entity coupled to the first interface unit, wherein the received first event message comprises information indicative of a specific type of occurred change of at least one component of the first entity;

a second interface unit for coupling a second entity;

a backlog storage unit configured to store at least the received first event message and configured to determine whether at least the second entity is a subscriber of the specific type of occurred change of the first event message in dependence on a subscriber table; and a first bridge unit configured to translate, if the second entity is a subscriber of the specific type of occurred change of the first event message, the received first event message by using a first semantic translation into a translated first event message, wherein the second interface unit is configured to receive the translated first event message from the first bridge unit and to transmit the received translated first event message to the second entity.

According to the first aspect, the reliability of the data transmission within the communication bus of the system is improved.

With the above-described system, it is possible to transmit an occurred change of at least one component of a respective entity, for example, the first entity, between the first and at least the second entity via the first and second interface units of the system and at the same time translate the semantic of the occurred change of the first entity into a semantic of the second entity by means of the respective bridge unit, for example, the first bridge unit.

This leads to the technical effect of ensuring that when a change occurs in an entity, this change is, if necessary, is translated and transmitted to all entities that have subscribed to this change. This advantageously improves the reliability of the communication bus and the entities coupled to it and reduces the susceptibility to errors in the data transmission (communication) between the respective entities.

In addition, the following further technical effects or advantages result from the system described above:

Since the system has an event-message-based architecture, only those entities which are a subscriber of a specific type of occurred change of the respective event message do receive the respective event message or the translated respective event message. On the one hand, this results in avoiding unnecessary communication between entities that are not a subscriber of the specific type of occurred change of the respective event message. This leads to a reduced communication load on the communication bus of the system due to this directed and selected communication. On the other hand, only as many bridge units are implemented as are necessary, for example, one bridge unit for a communication between a first entity and a second entity. Thus, no semantic translation by a bridge unit from a semantic of a first entity into a semantic of an entity which is not a subscriber of an event message from the first entity is necessary. Therefore, required computing resources of the communication bus of the system are reduced, which accelerates in an advantageous manner the computing time of the communication bus of the system during communication. Furthermore, memory space is advantageously kept free due to fewer required computing resources.

A further advantage is the possibility to flexibly extend the number of participants using the communication bus of the system, in particular the respective interface units with their coupled respective entities as well as the number of event messages, since a new participant for the communication bus only needs an interface unit and probably needs a bridge unit for translating the respective semantic of an occurred change of an event message. For example, it is possible to implement at the beginning of the implementation of the communication bus of the system only two entities which are transmitting data amongst them and extend the number of participants using the communication bus over the time to any desired size. In addition, exclusively the bridge units which are required for semantic translations have to be implemented which reduces the number of bridge units needed. Thus, it is easy to scale the communication bus of the system to a large number of event messages and/or respective interface units with assigning respective entities which leads to a higher flexibility of the communication bus.

The above-described communication bus of the system has the further advantage that it is not necessary for respective entities, which want to exchange data, to share a separate technical interface between them since each respective entity is coupled to an own respective interface unit for data communication which is specific for the respective entity and connected to the communication bus. This saves computing resources of the communication bus.

Further, since the communication bus of the system is configured to implement the bridge units external to the respective entities, the communication bus can be implemented in existing engineering projects. This leads to a high integrability of the communication bus.

The communication bus of the system is configured for coupling respective entities via respective interface units to the communication bus and to communicate occurred changes amongst respective entities via respective event messages.

Specifically, each respective entity comprises a subscription to one or more specific types of occurred changes of one or more components of another respective entity.

The system can comprise more than the first and the second interface unit. For example, the system can comprise a third, a fourth, a fifth and a sixth interface unit and/or ten, 20, 75 or 100 or more interface units. In particular, each respective interface unit is configured for coupling a respective entity. Thus, the number of respective entities is proportional to the number of respective interface units of the system.

In particular, in the above-described communication bus of the system, the second entity is a subscriber of the event message from the first entity. But it is also provided that the first entity can be a subscriber of an event message from the second entity. In this case, the second interface unit is configured to receive an event message from the second entity. Then, the first bridge unit is configured to translate the received event message by using a semantic translation into a translated event message which is then transmitted from the bridge unit to the first entity via the first interface unit. In other words, each respective entity can be both a transmitter (or a source) for transmitting at least an event message and a receiver (or a target) for receiving at least an event message or a translated event message.

The respective bridge unit, for example the first bridge unit, translates the semantic of the first entity (source entity) into the semantic of the second entity (target entity). In particular, one bridge unit has to be implemented in the system for each semantic translation between two respective entities which respectively comprises different semantics. For example, if a first entity propagates occurred changes to two other target entities, two bridge units have to be implemented in the system.

Moreover, there can be a case when the semantic of the entity which is a subscriber of an event message and the semantic of the entity which transmits this event message is the same. In particular in this case, no semantic translation via a bridge unit is necessary and both entities can transmit the event message between them without using a bridge unit.

In particular, the term subscriber covers entities that subscribe to a specific type of occurred change of at least one component in another entity, thus gaining access to it.

The subscriber table is stored in the backlog storage unit of the system and comprises a table which comprises information indicative of which entity is a subscriber of which specific type of occurred change of at least one component of a respective entity. The subscriber table can be updated after a certain elapsed time or when new entities are coupled to the system.

The respective unit, e.g., the first interface unit or the second interface unit, and/or the communication bus may be implemented in hardware and/or in software. If said unit and/or communication bus is implemented in hardware, it may be embodied as a device, e.g. as a computer or as a processor or as a part of a system, e.g. a computer system. If said unit and/or communication bus is implemented in software it may be embodied as a computer program product (non-transitory computer readable storage medium having instructions, which when executed by a processor, perform actions), as a function, as a routine, as a program code or as an executable object.

A respective entity, for example the first, the second, the third entity or another entity which is coupled via a respective interface unit to the communication bus of the system, can be embodied as an engineering tool which is implemented in software and/or in hardware. Examples of engineering tools comprise mechanical, electrical, automation and business engineering tools. In particular, the respective engineering tool is used in a planning stage of an engineering project. For example, a respective engineering tool can be operated by a user like a human operator or an automated computer program.

In particular, if an existing entity is to be coupled to the communication bus, a sidecar pattern is used. Specifically, sidecar is the name of a pattern where one part of the sidecar integrates with the existing entity using already provided interfaces and on the other hand integrates towards another system. This has the advantage that by using the sidecar pattern, elderly entities are compatible with the communication bus of the system.

According to an embodiment, the first semantic translation comprises a translation of a semantic of the specific type of occurred change which has a semantic which is specific for the first entity into a further semantic which is specific for the second entity by means of a semantic language for translating the first event message.

In particular, the semantic language comprises Web Ontology Language, Atlas Transformation Language and/or Shapes Constraint Language.

For example, the backlog storage unit comprises a semantic table, in which semantic mappings in dependence on the semantic languages between different semantics or further semantics of the respective entities are included. In particular, the backlog storage unit is connected with each respective bridge unit and is configured to provide the semantic table to each respective bridge unit. The respective bridge unit is configured to translate, by using the semantic table and the semantic language, the respective event message into a translated respective event message.

According to a further embodiment, the semantic and/or the further semantic comprises a number of physical quantities and/or a number of physical units which are assigned to the respective physical quantities, wherein a number of physical quantities comprises at least an electrical quantity, for example a speed of an electrical engine, and/or a mechanical quantity, for example a length of a conveyer belt.

In the following, an example for a semantic translation, in particular the first semantic translation, is given:

The first entity which can be embodied as a mechanical engineering tool comprises an electrical engine, wherein the speed of the electrical engine may be called rotation speed. In the second entity which can be embodied as an electrical engineering tool, the speed may be called revolutions. The respective bridge unit, here the first bridge unit, is then configured to translate the physical quantity "rotation speed [mechanical]" into "revolutions [electrical]". Thus, the second entity is configured to be able to understand the physical quantity of the speed of the electrical engine of the first entity. If the first and the second entities use different physical units, the bridge unit is further configured to translate, within the respective semantic translation, the respective physical unit of the first entity "1 Meters/Second" into "60 Meter/Minute" which is understandable by the second entity.

Further, one component like an electrical motor, can also comprise multiple physical quantities, for example nominal current, rotation speed, power input, torque, power consumption and the like.

According to a further embodiment, the specific type of occurred change comprises a case when a technical component is added to the first entity, a technical component of the first entity is modified, or a technical component is removed from the first entity.

In particular, one component is a technical component. Specifically, a modification of the technical component comprises a change of the length of the technical component, for example shorter or longer, adding more drilling holes or other drilling holes to the technical component, adding an electrical power cable to the technical component and the like.

According to a further embodiment, each interface unit of the system, in particular at least the first and second interface units, respectively comprises a primary interface and a secondary interface, wherein the primary interface is coupled to and specific for the respective entity, and the respective secondary interface is connected to the communication bus.

The secondary interface of a respective interface unit has the advantage that it has to be implemented only once in one respective interface unit and can be reproduced for all other respective interface units, whereby reducing the implementation effort of the communication bus of the system.

A secondary interface can be provided as an API (application programming interface).

In particular, in other words, the primary interface is specific for each entity coupled to the communication bus. For example, it has to be implemented for each entity and in dependence on each entity.

The primary interface of an entity which is the target entity, for example the second entity, is configured to control the integration of newly occurred changes received within the received translated first event message. In particular, if a newly occurred change is received by the respective interface unit, in particular the second interface unit, the second interface unit is not configured to automatically integrate the occurred change into the second entity. Specifically, the user can decide which type of occurred changes can automatically be taken over by the respective interface unit and which type of occurred changes require a confirmation of the user.

According to a further embodiment, at least the first interface unit is further configured to, upon receiving the first event message, publish the first event message at least to the backlog storage unit.

In particular, the secondary interface of the respective interface unit is configured to publish at least the first event message at least to the backlog storage unit.

The backlog storage unit is then configured to distribute the published first event message or the respective event message to a respective bridge unit or another storage, for example a change backlog storage of a respective interface unit.

According to a further embodiment, the respective interface unit, in particular the first and the second interface units, respectively comprises a change backlog storage for storing at least the first event message, multiple event messages, the translated first event message and/or multiple translated event messages, wherein the respective change backlog storage is connected to the backlog storage unit for transmitting data between at least one of the respective change backlog storage and the backlog storage unit.

The backlog storage unit comprises a sorted and prioritized list of the specific types of occurred changes of each respective event message. Since the backlog storage unit is connected to the respective change backlog storage, each user of the respective entity can individually decide which occurred changes he wants to see. The backlog storage unit is configured to track open change actions which are associated with occurred changes and to track the occurred changes itself.

The advantage of the backlog storage unit is that each participant of the system including the communication bus can have the information about what specific type of change has occurred and due to which entity it has occurred. This increases the transparency of the system.

In particular, the backlog storage unit comprises a change decision history table. In the change decision history table, every incoming occurred change and/or translated occurred change can be recorded, e.g. the date, the component, the component version and/or the specific type of occurred change.

Thus, the change decision history table indicates information about which technical component of which respective entity has the most occurred changes across different engineering projects, whereby reducing the failure safety of the respective interface units and entities, advantageously.

According to a further embodiment, the respective interface unit comprises a display unit which is configured to display a change log.

The display unit is configured to display a change log which comprises what specific types of changes and/or change actions have been performed in the respective entity. Specifically, the change log is provided by the respective change backlog storage and/or the backlog storage unit.

In particular, the respective display unit is configured to display the change log to the user of the respective entity associated to the respective display unit. In particular, the respective display unit is configured to display change recommendations and automatically performed changes and/or change actions to the user of the respective entity. Specifically, the user of the respective entity can then, for example, approve, reject, or adjust the changes and/or change actions.

Further, the backlog storage unit can comprise a screen unit wherein the screen unit is configured to display the change log.

The screen unit is used if it is not possible to display the change log via the respective display unit of the respective interface unit.

Specifically, the screen unit is configured to receive, from the respective interface unit, data, in particular meta-data, which describe if a change and/or a change action can be executed automatically in a respective entity, and which components and versions will be affected by this change and/or a change action.

For example, if a change and/or a change action in the respective entity has been performed automatically, a reference or a copy to the previous version will also be included in the change backlog storage and/or the backlog storage unit. This reference or copy can be utilized to roll back the change and/or the change action in case the user decides to reject the change and/or the change action.

According to a further embodiment, at least the first interface unit is further configured to detect the specific type of occurred change of at least one component of the first entity and is configured to receive at least the first event message in dependence on the detected specific type of occurred change from the first entity.

According to a further embodiment, the system is characterized by:

a third interface unit for coupling a third entity, wherein the backlog storage unit is configured to determine whether the third entity is a subscriber of the specific type of occurred change of the first event message in dependence on the subscriber table; and a second bridge unit, configured to translate, if the third entity is a subscriber of the specific type of occurred change of the first event message, the received first event message by using a second semantic translation into a translated second event message, wherein the third interface unit is configured to receive the translated second event message from the second bridge unit and to transmit the received translated second event message to the third entity.

According to a further embodiment, the second interface unit is further configured to, upon receiving the translated first event message, receive at least a second event message from the second entity, wherein the second event message comprises information indicative of the translated specific type of occurred change of the first event message of the first entity.

According to a further embodiment, the backlog storage unit is configured to store the second event message and to determine whether the third entity is a subscriber of the second event message, in particular of the translated specific type of occurred change of the first event message, in dependence on the subscriber table, wherein the system further comprises a third bridge unit being configured to translate, if the third entity is a subscriber of the second event message, the received second event message by using a third semantic translation into a translated third event message, wherein the third interface unit is configured to receive the translated third event message from the third bridge unit and to transmit the received translated third event message to the third entity.

According to a further embodiment, the respective interface unit, in particular the first, the second or the third interface unit, respectively comprises a recommender unit which is configured to create a respective change action for the respective entity coupled to the respective interface unit by using predefined rules on the specific type of occurred change of the respective entity and/or the translated specific type of occurred change of the respective entity, wherein the respective interface unit is configured to transmit the respective change action to the respective entity.

The recommender unit has the technical effect that it is configured to automatically trigger change actions in the respective entity using predefined rules. Advantageously, this eliminates manual work for users in case of simple changes. In particular, subsequent change actions in response to this occurred change will be propagated to further respective entities which are came later in the communication bus.

In particular, the respective change action is stored in the change log.

An example of a change action comprises a case when an electrical drive in an entity has to be exchanged due to an occurred change which requires a higher rotation speed. In particular, if the existing electrical drive in the entity fulfills the requirements for the higher rotation speed, the recommender unit is configured to create no change action. In other words, a change action is a type of change that is triggered by an occurrence of a change in one entity, in another entity.

In particular, the respective recommender unit is further configured to provide information on a potential impact of the occurred change and/or change action to the respective entity which is affected by the occurred change and/or change action.

For example, the respective recommender unit is configured to perform rule mining in order to obtain the predefined rules. In particular, rule mining comprises discovering frequent patterns in the occurred changes of the event messages and provide recommendations to the respective entities, specifically to the users controlling the respective entities.

An example of an implementation and distribution of a respective change action in the system including the communication bus is explained in the following: a first entity has a subscription of a "component unavailable-event". This leads in the first entity to a change of the component and a "change-event" is created, since the desired component is unavailable. If the newly changed component is relevant to another entity, this means if another entity (for example the second entity) has a subscription for the "change-event", then the recommender can recommend the "change-event" to the second entity.

For example, if the created respective change action is an easy change action for which a predefined rule exists (e.g., motor power must be upgraded to the next available power level), the recommender unit is configured to automatically perform this change action in the respective entity. In particular, the information about this change action is added to the change log and is displayed by the display unit or the screen unit to the user of the respective entity.

In particular, the predefined rule defines the reaction (the change action) to be taken as a response to a specific type of occurred change of at least one component of a respective entity. For example, if no predefined rule exists for an occurred change, a user is informed by a message that is displayed to the user by the display unit or the screen unit. The user can then do a manual change in the respective entity and document this again via the change log.

In embodiments, at least the backlog storage unit, the first bridge unit, a second bridge unit, a third bridge unit and/or a respective further bridge unit are not part of the communication bus but are connectable to said communication bus via a respective interface unit.

According to a further embodiment, the communication bus includes at least the first interface unit, the second interface unit, the backlog storage unit and the first bridge unit.

Any embodiment of the first aspect may be combined with any embodiment of the first aspect to obtain another embodiment of the first aspect.

According to a second aspect, a method for operating a communication bus for data transmission between multiple entities coupled to the communication bus is proposed. The method comprising:

a) receiving, by a first interface unit of the communication bus, a first event message from a first entity coupled to the first interface unit, wherein the received first event message comprises information indicative of a specific type of occurred change of at least one component of the first entity, b) storing at least the received first event message and determining whether a second entity coupled to a second interface unit of the communication bus is a subscriber of the specific type of occurred change of the first event message in dependence on a subscriber table, c) translating, by a first bridge unit, if the second entity is a subscriber of the specific type of occurred change of the first event message, the received first event message by using a first semantic translation into a translated first event message, d) transmitting the translated first event message from the first bridge unit to the second interface unit, and e) transmitting the translated first event message from the second interface unit to the second entity.

The technical effects and advantages described for the apparatus according to the first aspect apply equally to the method according to the second aspect.

Further, the embodiments and features described with reference to the apparatus according to the first aspect apply mutatis mutandis to the method according to the second aspect.

According to a further embodiment, the method is characterized by:

f) determining whether a third entity coupled to a third interface unit of the communication bus is a subscriber of the specific type of occurred change of the first event message in dependence on the subscriber table, g) translating, by a second bridge unit, if the third entity is a subscriber of the specific type of occurred change of the first event message, the received first event message by using a second semantic translation into a translated second event message, h) transmitting the translated second event message from the second bridge unit to the third interface unit, and i) transmitting the translated second event message from the third interface unit to the third entity.

According to a further embodiment, the method is characterized by:

f) receiving, upon transmitting the translated first event message to the second entity, at least a second event message from the second entity, wherein the second event message comprises information indicative of the translated specific type of occurred change of the first event message of the first entity, g) storing at least the received second event message and determining whether a third entity coupled to a third interface unit of the communication bus is a subscriber of the second event message, in particular of the translated specific type of occurred change of the first event message, in dependence on the subscriber table, h) translating, by a third bridge unit, if the third entity is a subscriber of the second event message, the received second event message by using a third semantic translation into a translated third event message, i) transmitting the translated third event message from the third bridge unit to the third interface unit, and j) transmitting the translated third event message from the third interface unit to the third entity.

According to a third aspect, a computer program product is proposed which comprises a program code for executing the above-described method according to the second aspect or an embodiment of the second aspect when run on at least one computer.

A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

In the Figures, like reference numerals designate like or functionally equivalent elements, unless otherwise indicated.

DETAILED DESCRIPTION

Figure 1:
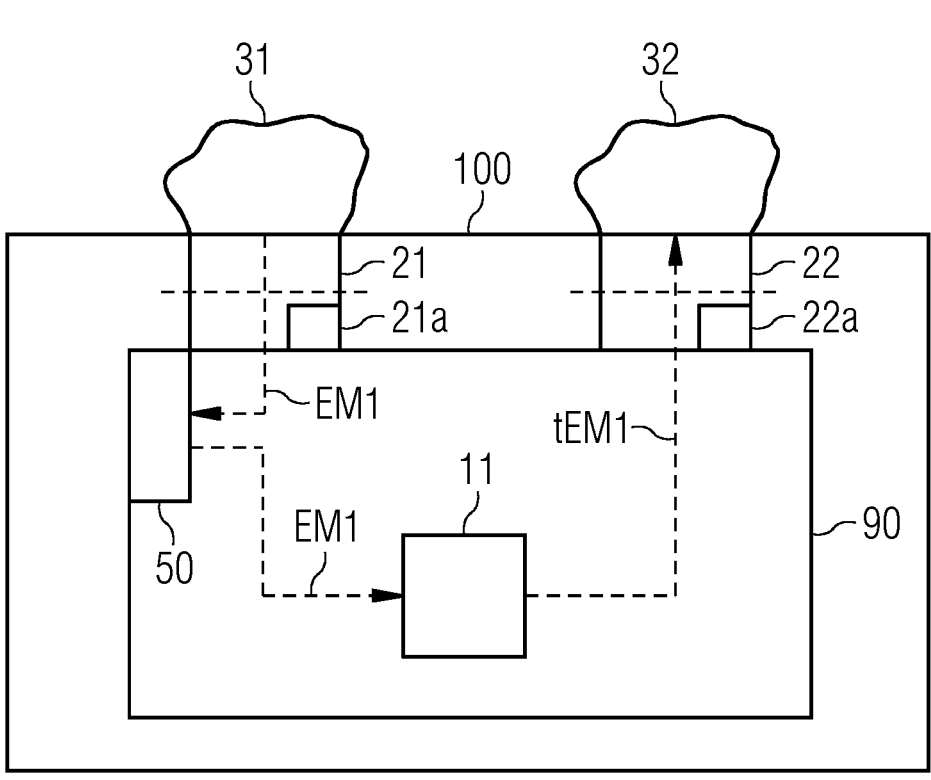
FIG. 1 shows a block diagram of a system including a communication bus according to an embodiment.

FIG. 1 shows a block diagram of a system including a communication bus 100 according to an embodiment. The communication bus 100 is configured for data transmission between multiple entities 31-33 coupled to the communication bus 100. In addition, references to the method steps of FIG. 3, which describes a method for operating a communication bus 100 according to an embodiment, are indicated in parentheses in the following explanations of FIG. 1.

The system including the communication bus 100 of FIG. 1 comprises a first interface unit 21, a second interface unit 22, a backlog storage unit 50 as well as a first bridge unit 11. Further, the first interface unit 21 is configured for coupling a first entity 31, while the second interface unit 22 is configured for coupling a second entity 32. In FIG. 1, the bridge unit 11 and the backlog storage unit 50 are arranged in a communication channel 90 of the communication bus 100, wherein the communication channel 90 is configured for data transmission.

Figures 2, 3:
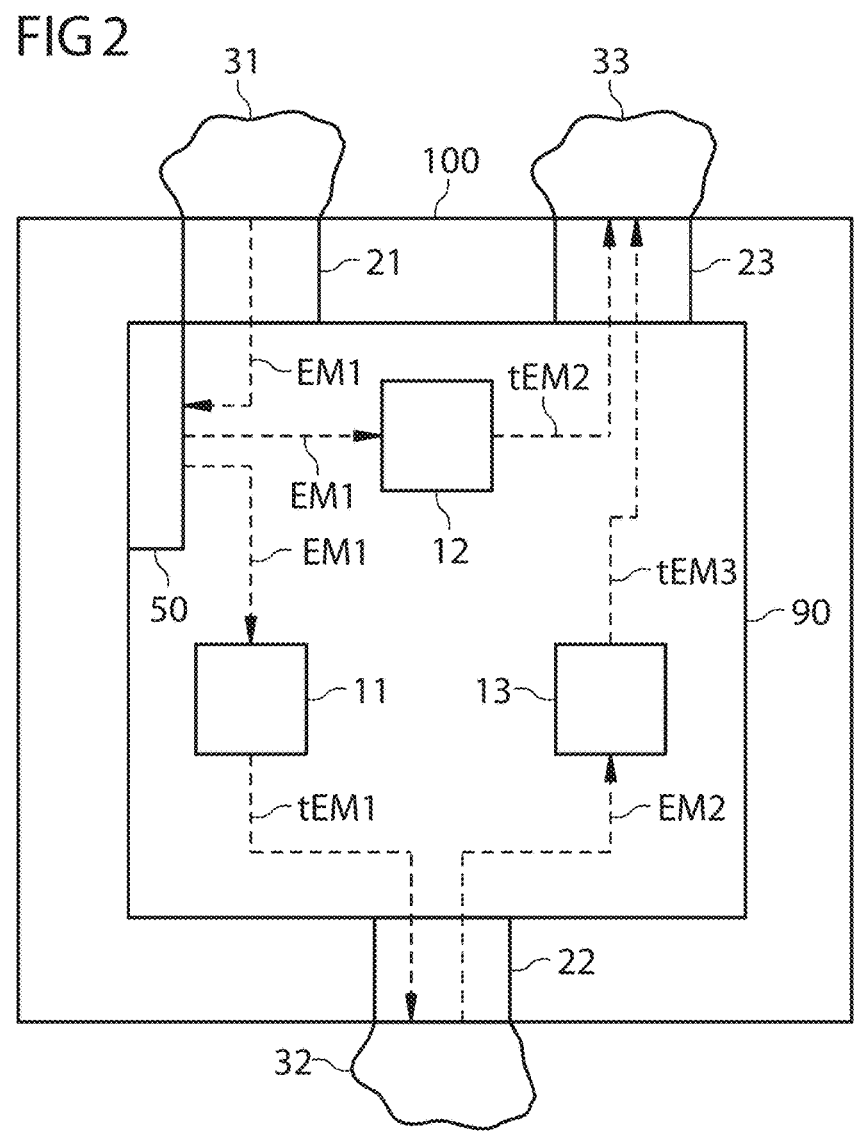
FIG. 2 shows a block diagram of a system including a communication bus according to a further embodiment.
FIG. 3 shows a flow chart illustrating the steps of a method for operating a communication bus according to an embodiment.

Firstly, the first interface unit 21 is configured to receive a first event message EM1 from the first entity 31 coupled to the first interface unit 21 (see method step S100 of FIG. 3). The received first event message EM1 comprises information indicative of a specific type of occurred change of at least one component of the first entity 31. After receiving the first event message EM1, the first interface unit 21 is configured to publish the first event message EM1 to the backlog storage unit 50 which is configured to store the first event message EM1 (see method step S101 of FIG. 3). This is indicated in FIG. 1 by the dashed line, which is denoted with EM1, from the first interface unit 21 to the backlog storage unit 50.

Then, the backlog storage unit 50 is configured to determine whether the second entity 32 is a subscriber of the specific type of occurred change of the first event message EM1 in dependence on a subscriber table (see also method step S101 of FIG. 3).

In FIG. 1, the second entity 32 is a subscriber of the specific type of occurred change of the first event message EM1. Thus, the first event message EM1 is transmitted to the first bridge unit 11. This is indicated in FIG. 1 by the dashed line, which is marked with EM1, from the backlog storage unit 50 to the first bridge unit 11.

The first bridge unit 11 is then configured to translate the received first event message EM1 by using a first semantic translation into a translated first event message tEM1 (see method step S102 of FIG. 3). In FIG. 1, the first semantic translation comprises a translation of a semantic of the specific type of occurred change which has a semantic which is specific for the first entity 31 into a further semantic which is specific for the second entity 32 by means of a semantic language for translating the first event message EM1.

Furthermore, the second interface unit 22 is configured to receive the translated first event message tEM1 from the first bridge unit 11 and to transmit the received translated first event message tEM1 to the second entity 32 (see method steps S103 and S104 of FIG. 3). In FIG. 1, this is indicated by the dashed line, which is denoted with tEM1, from the first bridge unit 11 to the second entity 32.

Moreover, the first and second interface units 21, 22 respectively comprises a primary interface and a secondary interface. As shown in FIG. 1, the primary interface is the interface above the dashed line of the respective interface 21, 22 and is coupled to and specific for the respective entity 31, 32. In addition, the respective secondary interface is below the dashed line and is connected to the communication bus 100, respectively.

As shown in FIG. 1, the first and the second interface units 21, 22 respectively comprises a change backlog storage 21a, 22a for storing the first event message EM1 or the translated first event message tEM1. In addition, the respective change backlog storage 21a, 22a is connected to the backlog storage unit 50 for transmitting data between at least one of the respective change backlog storage 21a, 22a and the backlog storage unit 50. This connection is not shown.

FIG. 2 shows a block diagram of a system including a communication bus 100 according to a further embodiment. In addition to FIG. 1, the system including the communication bus 100 of FIG. 2 comprises a third interface unit 23 for coupling a third entity 33, a second bridge unit 12 and a third bridge unit 13.

The respective interface unit 21-23 of FIG. 2 respectively comprises a recommender unit which is configured to create a respective change action for the respective entity 31-33 coupled to the respective interface unit 21-23 by using predefined rules on the specific type of occurred change of the respective entity 31-33 or the translated specific type of occurred change of the respective entity 31-33.

In FIG. 2, the first entity 31 is embodied as a mechanical engineering tool, the second entity 32 is embodied as an automation engineering tool and the third entity 33 is embodied as an electrical engineering tool.

Using the block diagram of FIG. 2, a typical example of the application of the communication bus 100 of the system according to FIGS. 1 and 2 is explained.

A conveyer system for luggage for an airport is engineered, using the respective entities 31-33. For that purpose, an electrical drive is needed, which drives a conveyor belt for luggage.

Firstly, the first entity 31 selects a motor as an electrical drive and defines the physical quantities and physical units for that motor.

After the selection of the motor, the first interface unit 21 is configured to detect the specific type of occurred change of one component of the first entity 31, which is in this case the selection of a new motor, that is, a technical component is added to the first entity 31. Further, the first interface unit 21 is configured to receive a first event message EM1 in dependence on the detected specific type of occurred change from the first entity 31 including the information indicative of the selected new motor.

The first interface unit 21 is then configured to transmit the event message EM1 to the backlog storage unit 50. This is illustrated in FIG. 2 by the dashed line, marked with EM1, which extends from the first interface unit 21 to the backlog storage unit 50.

Then, the backlog storage unit 50 is configured to determine whether the second entity 32 is a subscriber of the specific type of occurred change of the first event message EM1 in dependence on the subscriber table.

Further, in FIG. 2, the second entity 32 is a subscriber of the first event message EM1.

After that, the backlog storage unit 50 is configured to transmit the first event message EM1 to the first bridge unit 11. This is illustrated in FIG. 2 by the dashed line, denoted with EM1, which extends from the backlog storage unit 50 to the first bridge unit 11.

Then, the first bridge unit 11 is configured to translate the received first event message EM1 by using a first semantic translation into a translated first event message tEM1. By using the first semantic translation, the second entity 32 is able to understand the semantic of the first event message EM1 from the first entity 31.

After that, the second interface unit 22 is configured to receive the translated first event message tEM1 from the first bridge unit 11 and to transmit the translated first event message tEM1 to the second entity 32. In FIG. 2, this is indicated by the dashed line, which is denoted with tEM1, from the first bridge unit 11 to the second entity 32.

Thus, at this time point, the second entity 32 has the information that a new motor has been selected in the first entity 31. This means now that the second entity 32 which is embodied as an automation engineering tool has been informed that the automation process must be adapted to the new motor. In particular, prior to the transmitting of the translated first event message tEM1 from the first bridge unit 11 to the second entity 32 via the second interface unit 22, the second entity 32 gets informed via its change backlog storage 22a (see FIG. 1) which is connected to the backlog storage unit 50 (this connection is not illustrated) that a new motor has been selected from the first entity 31.

Subsequently, due to the adaption of the automation process to the new motor, the second interface unit 22 is configured to receive a second event message EM2 from the second entity 32 (please see the dashed line, marked with EM2, starting from the second entity 32 in FIG. 2). The second event message EM2 comprises information indicative of the adaption of the automation process to the new motor.

The second event message EM2 is then automatically translated (not showed) by the first bridge unit 11 and is transmitted back (not showed) to the first interface unit 21 since the first entity 31 is a subscriber of the specific type of occurred change of the second event message EM2, namely the adaption of the automation process data. Further, the change backlog storage 21a (see FIG. 1) of the first entity 31 is notified about the occurred changes included in the second event message EM2.

The occurred changes included in the first event message EM1 and the second event message EM2 automatically lead to a notification to the third entity 33 by the change backlog storage 23a (see FIG. 1) of the third entity 33, since the third entity 33 is a subscriber of the specific type of occurred changes of the first event message EM1 and the second event message EM2.

Thus, the second bridge unit 12 is configured to translate the first event message EM1 received by the backlog storage unit 50 by using a second semantic translation into a translated second event message tEM2. Then, the second bridge unit 12 is configured to transmit the translated second event message tEM2 to the third interface unit 23. Then, the third interface unit 23 is configured to transmit the translated second event message tEM2 to the third entity 33. In FIG. 2, this is indicated by the dashed lines, which are denoted with EM1 and tEM2, which connect the backlog storage unit 50 with the second bridge unit 12 and the second bridge unit 12 with the third interface unit 23.

In addition, the third bridge unit 13 is configured to translate the second event message EM2 received by (not shown) the backlog storage unit 50 or by the second interface unit 22 by using a third semantic translation into a translated third event message tEM3. Then, the third bridge unit 13 is configured to transmit the translated third event message tEM3 to the third interface unit 23. In FIG. 2, this is indicated by the dashed line, which is marked with tEM3, which connects the third bridge unit 13 with the third interface unit 23.

Then, the third entity 33 has the information about the newly selected motor via the translated second event message tEM2 from the first entity 31 and the information about the adapted automation process via the translated third event message tEM3 from the second entity 32. Afterwards, the third entity 33 can choose a suitable electrical cable for connecting the new motor. This occurred change of choosing a suitable electrical cable can cause another event message, to which the first entity 31, the second entity 32 or further entities (not illustrated) being a subscriber. Thereafter, this process is repeated and the thereby created event messages are transmitted to the backlog storage unit 50 of the system including the communication bus 100.

Later on, due to changes in the building structure, a section of the conveyor belt has to be extended. The first entity 31 is configured to increase the length of the conveyor belt. This will cause again an event message, for example a first event message EM1. The first interface unit 21 is then configured to transmit the first event message EM1 to the backlog storage unit of the system including the communication bus 100.

The third entity 33 has a subscription for the first event message EM1. Thus, the second bridge unit 12 is configured to translate the first event message EM1 by using the second semantic translation into a translated second event message tEM2 which is then transmitted to the third interface unit 23 and the third entity 33.

Then, the third entity 33 is notified about that the length of the conveyer belt has increased. Afterwards, the recommender unit of the third interface unit 23 is automatically configured to check, by using predefined rules, if the power of the existing motor of the third entity 33 is sufficient for driving the conveyer belt with its increased length. As a result, the existing motor is not sufficient for driving the conveyer belt with its increased length, so a new motor has to be selected by the first entity 31. For this purpose, a new event message is created by the third entity 33 for which the first entity 31 is a subscriber and the process for operating the communication bus 100 and transmitting different event messages from and to the communication bus 100 of the system starts again.

FIG. 3 shows a flow chart illustrating the steps of a method for operating a communication bus 100 (see FIG. 1 or 2) according to an embodiment. The method comprises the steps S100 to S104. The respective method steps S100 to S104 have already been explained above in terms of FIG. 1, which is why, in order to avoid repetitions, the method steps S100 to S104 are not explained again.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE NUMERALS 11 first bridge unit
12 second bridge unit
13 third bridge unit
21 first interface unit
21a change backlog storage
22 second interface unit
22a change backlog storage
23 third interface unit
23a change backlog storage
31 first entity
32 second entity
33 third entity
50 backlog storage unit
90 communication channel
100 communication bus
EM1 first event message
EM2 second event message
S100 method step
S101 method step
S102 method step
S103 method step
S104 method step
tEM1 translated first event message
tEM2 translated second event message
tEM3 translated third event message

The invention claimed is:

1. A system including a communication bus for data transmission between multiple entities coupled to the communication bus, the system comprising:

a first interface unit configured to receive a first event message from a first entity coupled to the first interface unit, wherein the received first event message comprises information indicative of a specific type of occurred change of at least one component of the first entity, wherein the specific type of occurred change comprises a case when a technical component is added to the first entity, a technical component of the first entity is physically modified, or a technical component is removed from the first entity;

a second interface unit for coupling a second entity;

a backlog storage unit configured to store at least the received first event message and configured to determine whether at least the second entity is a subscriber of the specific type of occurred change of the first event message in dependence on a subscriber table; and a first bridge unit external to the first entity and configured to translate, if the second entity is a subscriber of the specific type of occurred change of the first event message, the received first event message by using a first semantic translation into a translated first event message, wherein the first semantic translation comprises a translation of a semantic of the specific type of occurred change which has a semantic which is specific for the first entity into a further semantic which is specific for the second entity by a semantic language for translating the first event message, wherein the second interface unit is configured to receive the translated first event message from the first bridge unit and to transmit the received translated first event message to the second entity;

wherein one bridge unit is implemented in the system for each semantic translation between two respective entities which respectively comprises different semantics such that when the first entity propagates occurred changes to the second entity and a third entity, the first bridge unit and a second bridge unit are implemented for translating to the second entity and the third entity, respectively.

2. The system according to claim 1, wherein the semantic and/or the further semantic comprises a number of physical quantities and/or a number of physical units which are assigned to the respective physical quantities, wherein a number of physical quantities comprises at least an electrical quantity and/or a mechanical quantity.

3. The system according to claim 1, wherein each interface unit of the system comprises a primary interface and a secondary interface, wherein the primary interface is coupled to and specific for the respective entity, and the respective secondary interface is connected to the communication bus.

4. The system according to claim 1, wherein at least the first interface unit is further configured to, upon receiving the first event message, publish the first event message at least to the backlog storage unit.

5. The system according to claim 4, wherein the first interface unit and the second interface unit, respectively comprises a change backlog storage for storing at least the first event message, multiple event messages, the translated first event message and/or multiple translated event messages, wherein the respective change backlog storage is connected to the backlog storage unit for transmitting data between at least one of the respective change backlog storage and the backlog storage unit.

6. The system according to claim 1, wherein at least the first interface unit is further configured to detect the specific type of occurred change of at least one component of the first entity and is configured to receive at least the first event message in dependence on the detected specific type of occurred change from the first entity.

7. The system according to claim 1, further comprising:

a third interface unit for coupling the third entity, wherein the backlog storage unit is configured to determine whether the third entity is a subscriber of the specific type of occurred change of the first event message in dependence on the subscriber table; and the second bridge unit, configured to translate, if the third entity is a subscriber of the specific type of occurred change of the first event message, the received first event message by using a second semantic translation into a translated second event message, wherein the third interface unit is configured to receive the translated second event message from the second bridge unit and to transmit the received translated second event message to the third entity.

8. The system according to claim 7, wherein the second interface unit is further configured to, upon receiving the translated first event message, receive at least a second event message from the second entity, wherein the second event message comprises information indicative of the translated specific type of occurred change of the first event message of the first entity.

9. The system according to claim 8, wherein the backlog storage unit is configured to store the second event message and to determine whether the third entity is a subscriber of the second event message, in particular of the translated specific type of occurred change of the first event message, in dependence on the subscriber table, wherein the system further comprises a third bridge unit being configured to translate, if the third entity is a subscriber of the second event message, the received second event message by using a third semantic translation into a translated third event message, and wherein the third interface unit is configured to receive the translated third event message from the third bridge unit and to transmit the received translated third event message to the third entity.

10. The system according to claim 1, wherein the respective interface unit respectively comprises a recommender unit which is configured to create a respective change action for the respective entity coupled to the respective interface unit by using predefined rules on the specific type of occurred change of the respective entity and/or the translated specific type of occurred change of the respective entity, wherein the respective interface unit is configured to transmit the respective change action to the respective entity.

11. A method for operating a communication bus for data transmission between multiple entities coupled to the communication bus, the method comprising:

a) receiving, by a first interface unit of the communication bus, a first event message from a first entity coupled to the first interface unit, wherein the received first event message comprises information indicative of a specific type of occurred change of at least one component of the first entity, wherein the specific type of occurred change comprises a case when a technical component is added to the first entity, a technical component of the first entity is physically modified, or a technical component is removed from the first entity, b) storing at least the received first event message and determining whether a second entity coupled to a second interface unit of the communication bus is a subscriber of the specific type of occurred change of the first event message in dependence on a subscriber table, c) translating, by a first bridge unit external to the first entity, if the second entity is a subscriber of the specific type of occurred change of the first event message, the received first event message by using a first semantic translation into a translated first event message, wherein the first semantic translation comprises a translation of a semantic of the specific type of occurred change which has a semantic which is specific for the first entity into a further semantic which is specific for the second entity by a semantic language for translating the first event message, d) transmitting the translated first event message from the first bridge unit to the second interface unit, and e) transmitting the translated first event message from the second interface unit to the second entity;

wherein one bridge unit is implemented in the system for each semantic translation between two respective entities which respectively comprises different semantics such that when the first entity propagates occurred changes to the second entity and a third entity, the first bridge unit and a second bridge unit are implemented for translating to the second entity and the third entity, respectively.

12. The method according to claim 11, further comprising:

f) determining whether the third entity coupled to a third interface unit of the communication bus is a subscriber of the specific type of occurred change of the first event message in dependence on the subscriber table, g) translating, by the second bridge unit, if the third entity is a subscriber of the specific type of occurred change of the first event message, the received first event message by using a second semantic translation into a translated second event message, h) transmitting the translated second event message from the second bridge unit to the third interface unit, and i) transmitting the translated second event message from the third interface unit to the third entity.

13. The method according to claim 11, further comprising:

f) receiving, upon transmitting the translated first event message to the second entity, at least a second event message from the second entity, wherein the second event message comprises information indicative of the translated specific type of occurred change of the first event message of the first entity, g) storing at least the received second event message and determining whether the third entity coupled to a third interface unit of the communication bus is a subscriber of the translated specific type of occurred change of the first event message, in dependence on the subscriber table, h) translating, by a third bridge unit, if the third entity is a subscriber of the second event message, the received second event message by using a third semantic translation into a translated third event message, i) transmitting the translated third event message from the third bridge unit to the third interface unit, and j) transmitting the translated third event message from the third interface unit to the third entity.

14. A computer program product, comprising a computer readable hardware storage device having computer readable program code stored therein, said program code executable by a processor of a computer system to implement a method comprising a program code for executing the method according to claim 11 when run on at least one computer.

15. A system including a communication bus for data transmission between multiple entities coupled to the communication bus, the system comprising:

a first interface unit configured to receive a first event message from a first entity coupled to the first interface unit, wherein the received first event message comprises information indicative of a specific type of occurred change of at least one component of the first entity, wherein the specific type of occurred change comprises a case when a technical component is added to the first entity, a technical component of the first entity is physically modified, or a technical component is removed from the first entity;

a second interface unit for coupling a second entity;

a backlog storage unit configured to store at least the received first event message and configured to determine whether at least the second entity is a subscriber of the specific type of occurred change of the first event message in dependence on a subscriber table; and a first bridge unit configured to translate, if the second entity is a subscriber of the specific type of occurred change of the first event message, the received first event message by using a first semantic translation into a translated first event message, wherein the first semantic translation comprises a translation of a semantic of the specific type of occurred change which has a semantic which is specific for the first entity into a further semantic which is specific for the second entity by a semantic language for translating the first event message, wherein the second interface unit is configured to receive the translated first event message from the first bridge unit and to transmit the received translated first event message to the second entity;

wherein the respective interface unit respectively comprises a recommender unit which is configured to create a respective change action for the respective entity coupled to the respective interface unit by using predefined rules on the specific type of occurred change of the respective entity and/or the translated specific type of occurred change of the respective entity, wherein the respective interface unit is configured to transmit the respective change action to the respective entity.

* * * * *